(12) United States Patent
Kwon et al.

(10) Patent No.: US 7,938,492 B2
(45) Date of Patent: May 10, 2011

(54) TOOTHBRUSH HAVING PRESSURE RELIEF UNIT AND METHOD OF PRODUCING SAME

(76) Inventors: Young-Jun Kwon, Gyunggi-do (KR); Sung-Wook Kwon, Seoul (KR); Sung-Hwan Kwon, Seoul (KR)

(*) Notice: Subject to any disclaimer, the term of this patent is extended or adjusted under 35 U.S.C. 154(b) by 887 days.

(21) Appl. No.: 11/817,495

(22) PCT Filed: Mar. 28, 2005

(86) PCT No.: PCT/KR2005/000903
§ 371 (c)(1), (2), (4) Date: Aug. 30, 2007

(87) PCT Pub. No.: WO2006/095937
PCT Pub. Date: Sep. 14, 2006

(65) Prior Publication Data
US 2008/0179938 A1      Jul. 31, 2008

(30) Foreign Application Priority Data
Mar. 11, 2005  (KR) ................. 10-2005-0020507

(51) Int. Cl.
*A46D 3/00*  (2006.01)
(52) U.S. Cl. ........................................ 300/21; 15/167.1
(58) Field of Classification Search ........... 15/21, 167.1, 15/190, 191.1, 193; 300/167.1, 4–5, 7–8, 300/10, 21
See application file for complete search history.

(56) References Cited

U.S. PATENT DOCUMENTS

| | | | |
|---|---|---|---|
| 5,318,352 A | | 6/1994 | Holland |
| 5,964,508 A | * | 10/1999 | Maurer .......................... 300/21 |
| 6,009,589 A | * | 1/2000 | Driesen et al. ............... 15/167.1 |
| 6,290,303 B1 | | 9/2001 | Boucherie |

FOREIGN PATENT DOCUMENTS

| | | |
|---|---|---|
| JP | 9-56475 | 3/1997 |
| JP | 9056475 | * 4/1997 |
| KR | 2004-105500 | 12/2004 |
| KR | 2004105500 | * 12/2004 |

* cited by examiner

*Primary Examiner* — Shay L Karls
(74) *Attorney, Agent, or Firm* — Egbert Law Offices PLLC

(57) ABSTRACT

Disclosed are a toothbrush and a method of producing the same. The toothbrush of the present invention includes a pressure relief unit installed in a head part of the toothbrush. The unit has a plate shape and a predetermined size sufficient to cover bristles set in the head part. In the present invention, the head part is thin, and the bristles are set in the head part without using a wire. Furthermore, the present invention is easily adapted for mass production using inexpensive equipment. Also, the pressure relief unit serves as a reinforcing unit. Therefore, the head part is prevented from breaking during use despite having a reduced thickness.

6 Claims, 6 Drawing Sheets

[Fig. 1]
[Fig. 2]
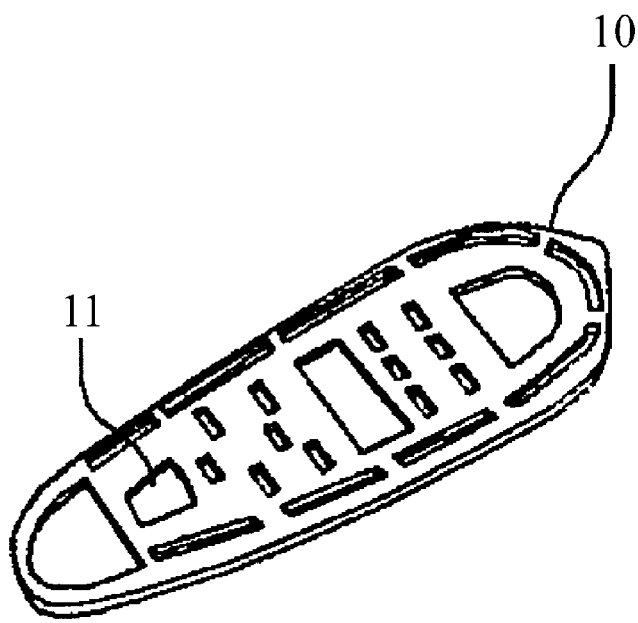
[Fig. 3]
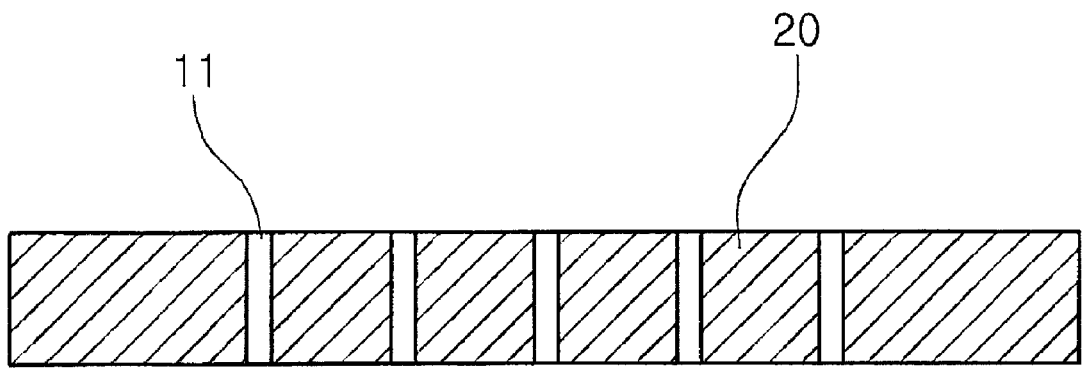

[Fig. 4]
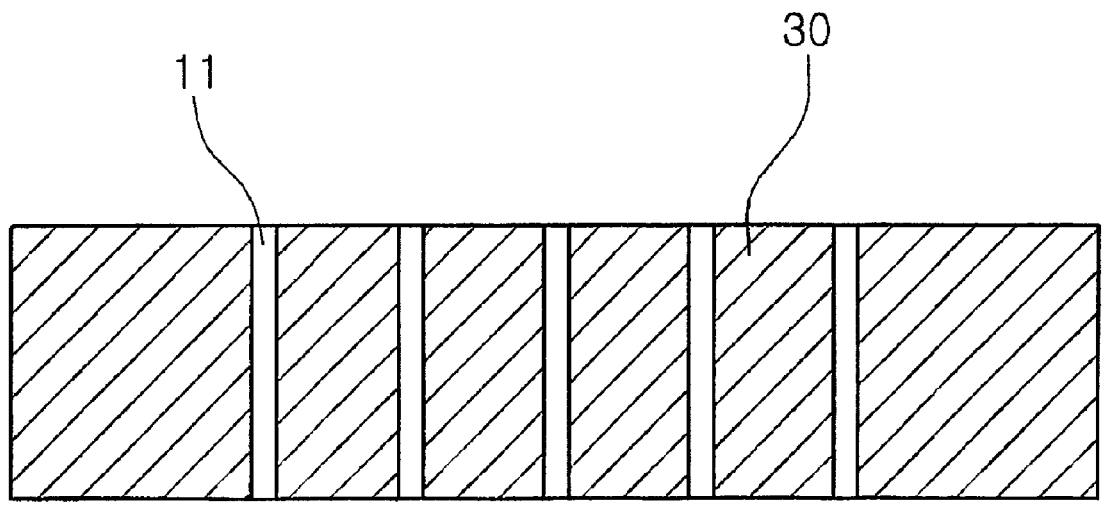
[Fig. 5]
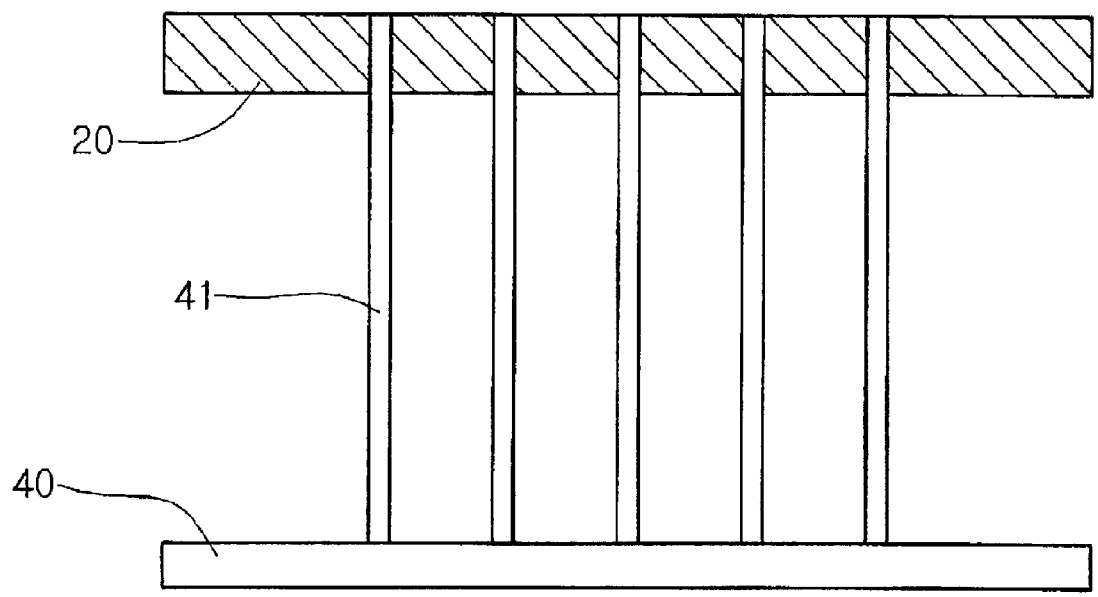

[Fig. 6]
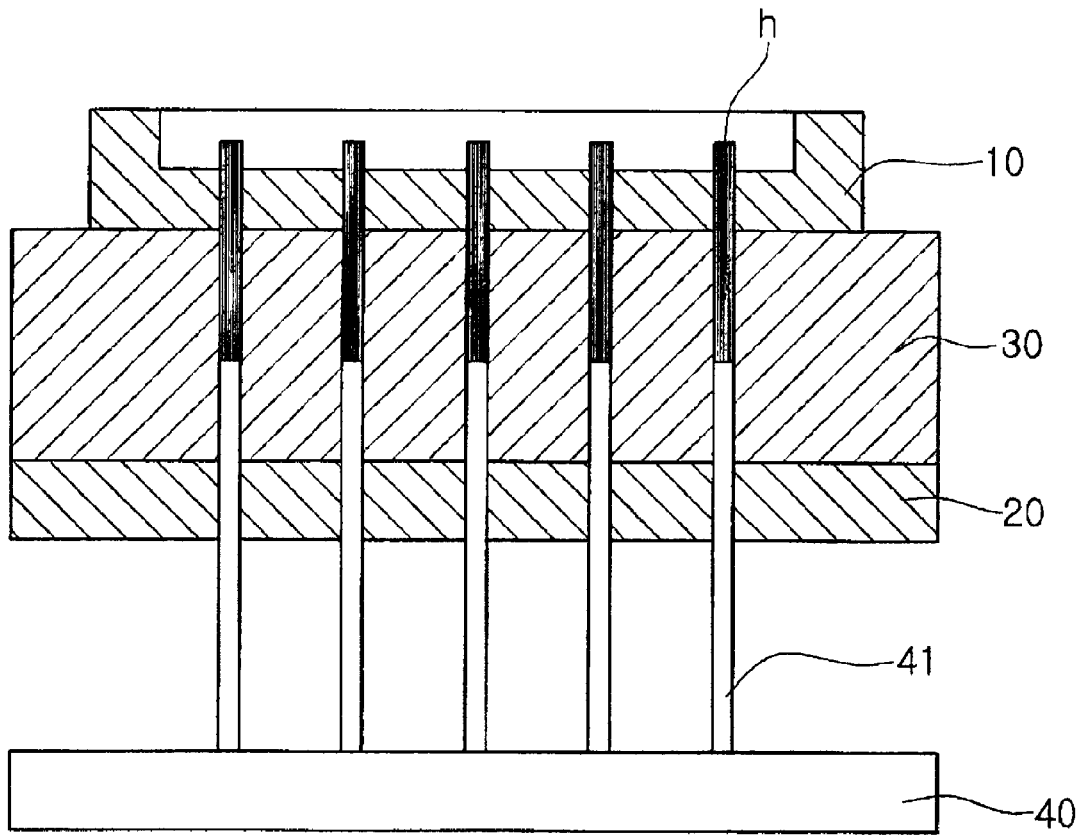
[Fig. 7]
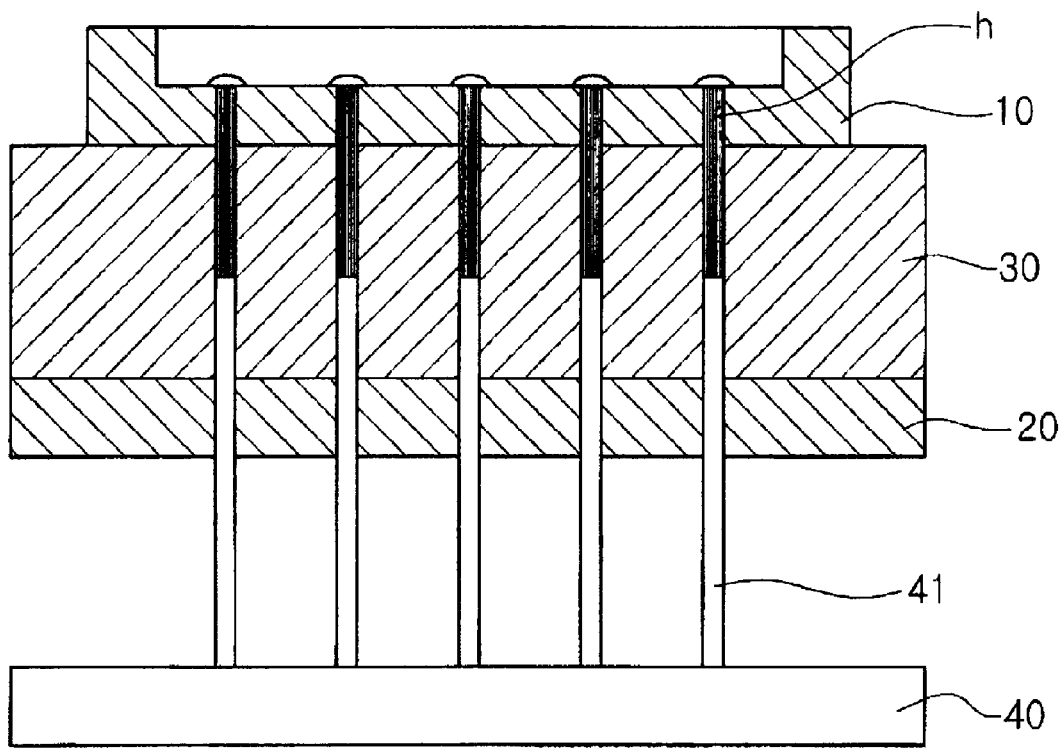

[Fig. 8]
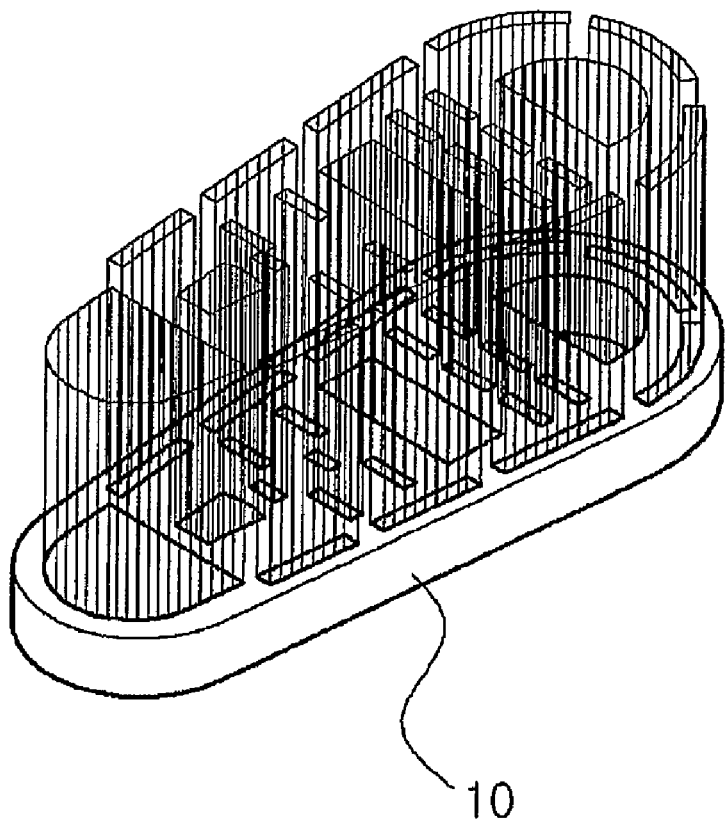
10
[Fig. 9]
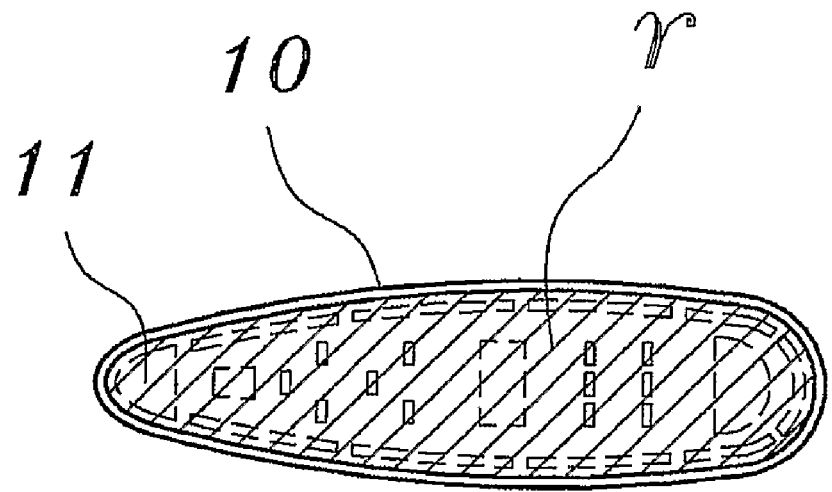
11   10   r

[Fig. 10]
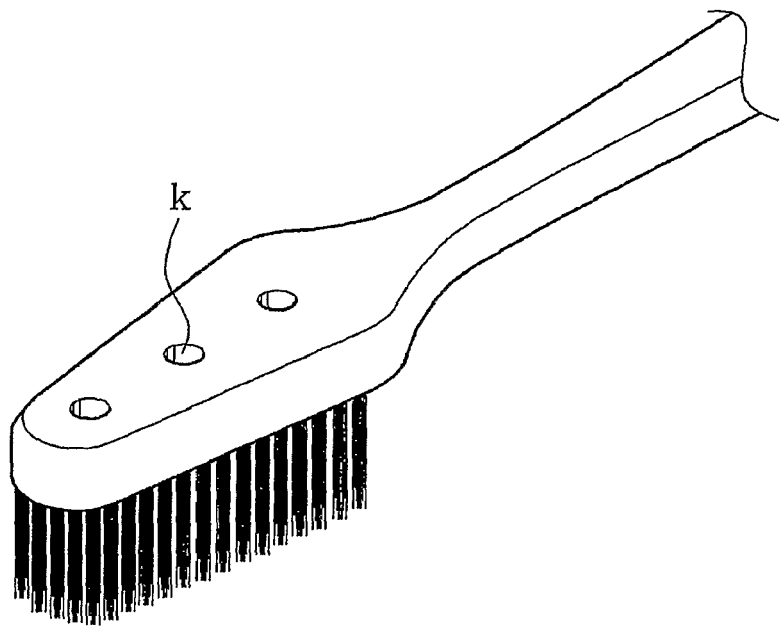
[Fig. 11]
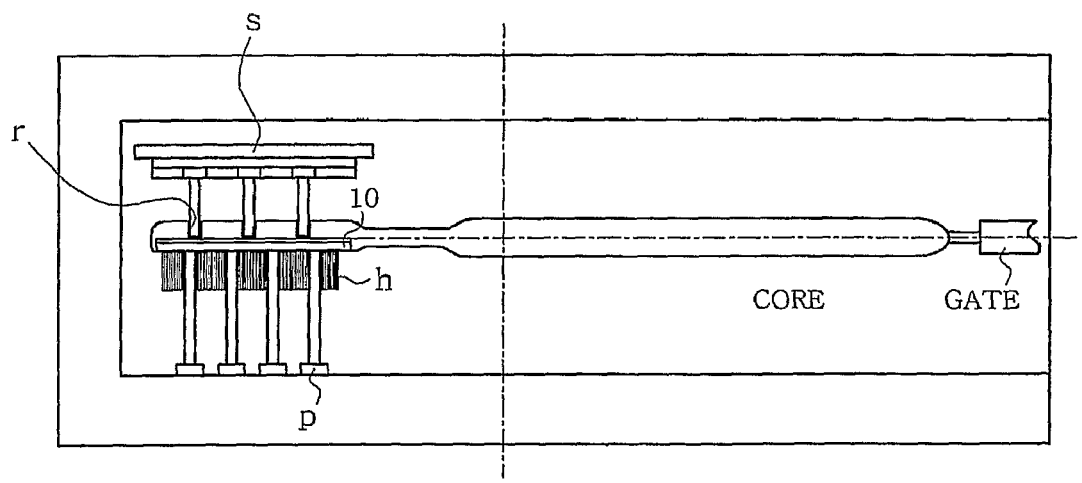

[Fig. 12]
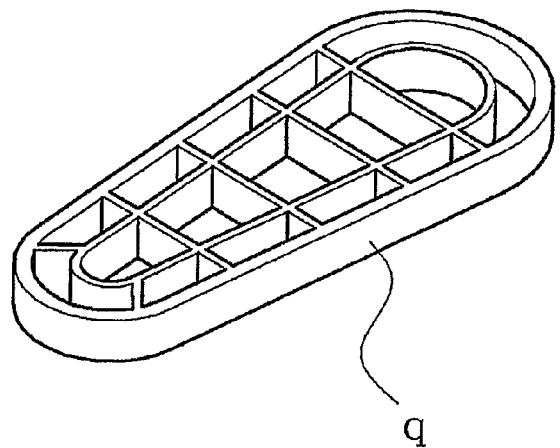
q
[Fig. 13]
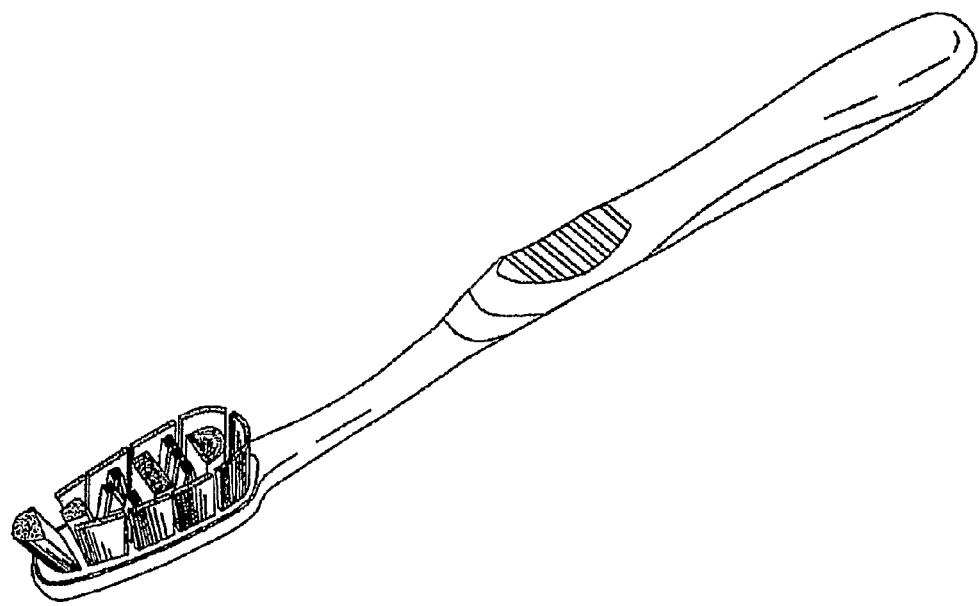

TOOTHBRUSH HAVING PRESSURE RELIEF UNIT AND METHOD OF PRODUCING SAME

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates, in general, to toothbrushes and methods of producing the same and, more particularly, to a toothbrush in which a pressure relief unit is installed in a head part of the toothbrush, and a method of producing the same.

2. Description of Related Art Including Information Disclosed Under 37 CFR 1.97 and 37 CFR 1.98

Generally, to produce a toothbrush, first, a toothbrush body having holes in a head part thereof is manufactured. Subsequently, bristles, folded in half, are set in the holes of the head part. The bristles are fastened to the toothbrush body by inserting wires, which are made of elastic metal and have a length greater than the diameter of the hole, into the holes.

However, such a toothbrush production method has disadvantages in that, because bristles are not reliably fixed to the toothbrush body, the bristles are easily removed from the toothbrush body, and impurities are easily held in the holes formed in the head part of the toothbrush. As well, this toothbrush producing method is problematic in that bristles cannot be set in various patterns.

As an example of techniques to overcome the above-mentioned problems, in Korean Patent No. 360977, bristles are set in a mold of an injection molding machine having a bristle setting device. Thereafter, portions of the bristles protruding into the mold are thermally welded through a heat treatment process. Subsequently, a toothbrush body is injection-molded along with the bristles so that the bristles are integrated with the toothbrush body. In this technique, the bristles are reliably fixed to the toothbrush body. Furthermore, because it is not necessary to form holes in a head part of the toothbrush, the problems of the prior art are solved.

However, the above-mentioned conventional technique has disadvantages as follow.

First, because toothbrushes are manufactured using a mold having a constant shape, it is very difficult to change the shape of the toothbrush body. The toothbrush body is frequently subject to changes due to trends. Therefore, the difficulty in changing the shape of the toothbrush body is a serious problem. Of course, toothbrush bodies having different shapes may be simultaneously manufactured by mounting several different molds to a single injection molding machine. However, in this case, there is a problem in that the same number of different toothbrushes must be manufactured and marketed.

Second, there is a problem in that if an error occurs even in one process of a series of manufacturing processes, all other processes must also be stopped. That is, the conventional technique consists of processes as follow: (1) a process of setting bristles in the mold, (2) a process of thermally welding parts of the bristles which protrude into the mold, and (3) a process of injection-molding a toothbrush. If an error occurs in even one among the above-mentioned processes, the production must be stopped.

Third, the injection molding machine is not operated during the setting and thermal welding processes. Accordingly, in consideration of the expensive injection molding machine having the bristle setting device, productivity per hour is markedly reduced.

To solve the above-mentioned problems, another technique was proposed in Korean Patent Application No. 10-2003-0036887.

In this technique, bristles are set in through holes formed through a head insert 10, which is made of plastic and has a thickness ranging from 1.5 to 3.0 mm, such that parts of the bristles protrude from a back surface of the head insert 10 by 1 to 3 mm. Thereafter, the protruded parts of the bristles are thermally welded, thus separately manufacturing the head insert 10 which has the bristles and is a partial-product. Subsequently, the head insert 10 having the bristles is placed in a cavity of the mold such that the bristles are placed outside the cavity of the mold. Thereafter, a toothbrush body is injection-molded by injecting resin into the mold using a normal injection molding machine, thus producing a toothbrush.

In this technique, a process of setting the bristles in the head insert 10, a process of thermally welding parts of the bristles which protrude from the back surface of the head insert 10, and a process of placing the head insert 10 having the bristles in the mold and injection-molding a toothbrush body are separately conducted. Therefore, even if an error occurs in one process, other processes can be conducted. Therefore, the rate of operation of equipment is markedly enhanced. Furthermore, the shape of the toothbrush can be easily changed merely by manufacturing an additional mold for the injection molding machine, which is relatively inexpensive.

However, in this technique, when injection-molding the toothbrush body after the head insert 10 having the bristles is placed in the mold, a phenomenon, in which resin may flow out along the bristles due to injection pressure, frequently arises. As such, if resin flows out along the bristles, the bristles become bonded to each other, so the value of the product is deteriorated.

Meanwhile, another toothbrush manufacturing method, in which a head insert 10 having bristles is separately manufactured and is then bonded to a toothbrush body, manufactured through a separate process, using ultrasonic waves, was proposed. In this technique, because a process of manufacturing the head insert 10 and a process of manufacturing the toothbrush body are separately conducted, the problem of deterioration of workability is solved. However, in this technique, because the head insert 10 is inserted into a head part of the toothbrush body and integrated with the toothbrush body using an ultrasonic bonding method, the head insert 10 must be precisely aligned with the toothbrush body. Therefore, an accurate mold is required, thus the price of equipment is excessively increased. Furthermore, there is a problem in that the head part of the toothbrush becomes too thick.

Generally, a head part of a toothbrush that is thin and narrow is more convenient for a user and increases tooth brushing efficiency. However, in the above-mentioned technique, because the head insert is bonded to the head part of the toothbrush along a bonding line (b) defined on a sidewall of the head part, the head part of the toothbrush becomes relatively thick (see, FIG. 1). To reduce the thickness of the head part of the toothbrush, the bonding operation may be conducted on the front surface of the head part. However, this bonding method requires an increase in the area of the head part and may cause damage to the bristles. Therefore, this bonding method should not be conducted.

BRIEF SUMMARY OF THE INVENTION

Accordingly, the present invention has been made keeping in mind the above problems occurring in the prior art, and an object of the present invention is to provide a toothbrush production method which solves problems of the conventional arts when holes are formed in a head part of a toothbrush body and wires are used, and which increases the productivity and permits the shape of a toothbrush body to be easily changed. Another object of the present invention is to provide a toothbrush production method in which even if an error occurs in one production process, other production processes are not affected. A further object of the present invention is to provide a toothbrush producing method which prevents resin from flowing out along set bristles during an injection molding process. Yet another object of the present invention is to provide a toothbrush which has a thin head part.

Technical Solution

In order to accomplish the above objects, the present invention provides a method of producing a toothbrush, including: setting bristles in a plurality of through holes formed through a head insert, which is made of plastic and has a thickness ranging from 1.5 to 3.0 mm, such that parts of the bristles protrude from a back surface of the head insert by 1 to 3 mm; fastening the bristles to the head insert by thermally welding the protruded parts of the bristles to the head insert, thus manufacturing the head insert with bristles; placing the head insert having the bristles in a cavity of a mold for manufacturing a toothbrush body such that the bristles are placed outside the cavity of the mold; and injecting resin and forming a toothbrush body. The method of the present invention further includes the step of placing a pressure relief unit having a plate shape on the back surface of the head insert before the step of injecting resin into the mold.

ADVANTAGEOUS EFFECTS

In the present invention, bristles can be set in a toothbrush body without wires. The work efficiency of an expensive injection molding machine is maximized. Furthermore, because a normal mold, which is manufactured in a desired shape, can be mounted to the injection molding machine, the shape of the toothbrush body is easily changed. As well, even if an error occurs in one production process, because other production processes are not affected, the productivity is maximized.

Particularly, the present invention can prevent a problem of resin flowing out along set bristles, experienced in Korean Patent Application No. 10-2003-0036887, which was filed by the inventor of the present invention. Furthermore, in the case that an appropriate pressure relief unit is used, a functional toothbrush such as an antibacterial toothbrush can be provided. Moreover, the present invention can produce a high grade toothbrush having reduced thickness. In addition, because the present invention uses the pressure relief unit (r) serving as a core material, the present invention solves a problem of the head part breaking during use due to its reduced thickness.

BRIEF DESCRIPTION OF THE SEVERAL VIEWS OF THE DRAWINGS

FIG. 1 is a side view showing a toothbrush manufactured by a conventional ultrasonic bonding method.

FIG. 2 is a perspective view of a head insert used in the present invention.

FIG. 3 is a side view of a first receiving unit used in the present invention.

FIG. 4 is a side view of a second receiving unit used in the present invention.

FIG. 5 is a sectional view showing a pushing plate inserted into the first receiving unit according to the present invention.

FIG. 6 is a sectional view showing a process of setting bristles into a head insert, according to the present invention.

FIG. 7 is a sectional view showing the bristles fastened to the head insert by thermally welding parts of the bristles protruding from a back surface of the head insert, according to the present invention.

FIG. 8 is a perspective view showing the head insert in which bristles are set.

FIG. 9 is a top plan view showing a pressure relief unit layered on the head insert according to the present invention.

FIG. 10 is a schematic view showing a hole formed in a head part of a toothbrush according to the present invention.

FIG. 11 is a perspective view showing the head insert placed in a cavity of a mold for manufacturing a toothbrush body through an injection molding process, according to the present invention.

FIG. 12 is a perspective view showing a holding unit to be used in the present invention.

FIG. 13 is a perspective view of a toothbrush produced by a toothbrush producing method according to the present invention.

DESCRIPTION OF THE ELEMENTS IN THE DRAWINGS

10: head insert
11: through hole
20: first receiving unit
30: second receiving unit
40: pushing plate
41: insert rod
h: bristle
p: support pin
s: automatic movable insertion device
r: pressure relief unit b: bonding line
k: hole q: holding unit

DETAILED DESCRIPTION OF THE INVENTION

A toothbrush of the present invention includes a pressure relief unit (r) which has a plate shape and a size that is sufficient to cover bristles set in a head part of the toothbrush.

Hereinafter, the present invention will be described in detail with reference to the attached drawings.

FIG. 2 is a perspective view of a head insert 10 which is used in the present invention. The head insert 10 is made of plastic and has a thickness ranging from 1.5 mm to 3.0 mm. If the thickness of the head insert 10 is less than the above-mentioned range, the head insert 10 may undesirably bend during a thermal welding process. If the thickness of the head insert 10 is greater than the above-mentioned range, the head part of a toothbrush is excessively thick.

The head insert 10 has through holes 11 therein so that bristles are set in the through holes 11. The through holes 11 may have different sizes, unlike conventional arts using wires. In other words, in consideration of the setting pattern of bristles, the size and shape of the through holes 11 may be appropriately adjusted.

To set bristles in the through hole 11 of the head insert 10, first, bristles are cut to predetermined lengths and are held by a first receiving unit 20 having the shape shown in FIG. 3. Thereafter, the bristles set in the head insert 10 are transferred to a second receiving unit 30 shown in FIG. 4 and, then, are transferred to the head insert 10. Here, the first receiving unit 20, the second receiving unit 30 and the head insert 10 have through holes corresponding to each other.

Furthermore, because the first receiving unit 20 and the second receiving unit 30 serve to repeatedly transfer bristles (h) to head inserts 10, they must be made of metal having superior durability.

A process of receiving bristles (h) into the first receiving unit 20 is as follows. The bristles (h) are received into the first receiving unit 20 by pushing the bristles (h) into the through holes 11 of the first receiving unit 20 using a pushing plate 40 (see, FIG. 5) provided with insert rods 41 having shapes corresponding to shapes of the through holes 11 of the first receiving unit 20.

A process of setting the bristles (h) in the head insert 10 is as follows. The first and second receiving units 20 and 30 and the head insert 10 come into contact with each other such that their through holes 11 are aligned with each other. Thereafter, the pushing plate 40 pushes the bristles (h), which are received in the first receiving unit 20, in the direction of the head insert 10 through the second receiving unit 30 (see, FIG. 6). At this time, the bristles (h) are set in the head insert 10 such that parts of the bristles (h) protrude from a back surface of the head insert 10 by 1 to 3 mm. If the protruding length of the bristles is less than the above-mentioned range, there is difficulty in closing the through holes 11 through a thermal welding process which will be explained later herein. If the protruding length of the bristles is greater than the above-mentioned range, there is a problem in that the head part of a toothbrush becomes excessively thick.

After the bristles (h) are set in the head insert 10, the parts of the bristles (h) which protrude from the back surface of the head insert 10 are melted by heating and thus are fastened to the head insert 10 by partially closing the through holes 11 (see, FIG. 7). The head insert 10 which has the bristles (h) and is a semi-finished product is shown in FIG. 8.

Prior to an injection molding process, a pressure relief unit (r) is layered on the back surface of the head insert 10 (which is the surface opposite to a side on which the bristles are placed) to which the bristles are fastened by thermal welding. The pressure relief unit (r) prevents resin from flowing out along the set bristles during the injection molding process.

As shown in FIG. 9, the pressure relief unit (r) has a size smaller than the size of the head insert, but has a predetermined size that can cover all through holes 11, which are formed through the head insert. If the size of the pressure relief unit (r) is greater than the above-mentioned range, there is a problem in that the head insert 10 cannot be integrated with a toothbrush body. If the size of the pressure relief unit (r) is less than the above-mentioned range, resin may undesirably flow outside through the set bristles.

The pressure relief unit (r) is made of metal or synthetic resin having a melting point higher than that of bristles. Preferably, a silver plate or silvered plate is used as the material for the pressure relief unit (r). The pressure relief unit (r) made of such a silver or silvered plate prevents resin from flowing out along the bristles and, as well, has an antibacterial effect and a dental calculus prevention effect thanks to the emission of silver ions. To ensure the above-mentioned effects, it is required to form a hole (k), which extends from the back surface of the head part to the pressure relief unit (r) (see, FIG. 10).

Preferably, the pressure relief unit (r) has a thickness ranging from 0.05 to 0.3 mm. If the thickness of the pressure relief unit (r) is less than the above-mentioned range, a pressure relief effect becomes insufficient. If the thickness of the pressure relief unit (r) is greater than the above-mentioned range, the head part of the toothbrush becomes excessively thick, thus reducing tooth brushing efficiency.

After the pressure relief unit (r) is layered on the back surface of the head insert 10 in which the bristles (h) are set, as shown in FIG. 11, the head insert 10 is placed in a cavity of a toothbrush forming mold using an automatic movable insertion device (s) such that the bristles (h) are placed outside the cavity of the mold. Thereafter, resin is injected into the mold, thus completing the manufacture of the toothbrush. Here, to prevent the head insert 10 having the bristles (h) from being pushed out by the injection pressure of resin, it is necessary to support the head insert 10 using a support pin (p).

More preferably, as shown in FIG. 12, a holding unit (q), which has through holes formed in the same pattern as the setting pattern of the bristles, is used in place of the support pin (p). In this case, every bristle passes through the through holes of the holding unit (q), and a front surface of the head insert 10 comes into close contact with the holding unit (q). The holding unit (q) prevents the head insert 10 from being pushed out by the injection pressure and, as well, solves a problem of the use of the support pin (p) in that the imprint of the support pin (p) remains on the front surface of the head insert 10. Furthermore, even in the case that the holding unit (q) is integrally mounted in the lower mold, the same effect is ensured.

As such, the bristles (h), the head insert 10 and the toothbrush body are integrated together through the above-mentioned production process. Furthermore, the present invention reliably prevents resin from flowing out along the bristles (h). The toothbrush produced according to the present invention is shown in FIG. 13.

We claim:
1. A method of producing a toothbrush comprising:
   forming a head insert of polymeric material and having a thickness of between 1.5 millimeters and 3.0 millimeters, said head insert having a plurality of through holes;
   setting a plurality of bristles in said plurality of through holes of said head insert such that portions of said plurality of bristles protrude outwardly of a back surface of said head insert by 1 to 3 millimeters;
   fastening said plurality of bristles to said head insert by thermally welding the protruding portions to said head insert;
   placing said head insert with the fastened bristles into a cavity of a mold such that the fastened bristles are outward of the cavity of the mold;
   placing a plate-shaped pressure relief unit on said back surface of said head insert; and injecting a resin under pressure into said cavity of said mold so as to form a toothbrush body, said pressure relief unit placed so as to prevent the resin from being pushed outwardly from the fastened bristles by the injection pressure.

2. The method of claim 1, said head insert being separable from said mold.

3. The method of claim 1, said pressure relief unit being formed of a metal or synthetic resin having a melting point higher than a melting point of said plurality of bristles.

4. The method of claim 1, said pressure relief unit having a thickness of between 0.05 millimeters and 0.3 millimeters.

5. The method of claim 1, said pressure relief unit having a size suitable for covering said through holes of said head insert but smaller than a total surface area of said head insert.

6. The method of claim 1, said heat insert having a hole formed therein communicating with said pressure relief unit.

* * * * *